(12) United States Patent
Bolduc

(10) Patent No.: US 12,005,976 B2
(45) Date of Patent: Jun. 11, 2024

(54) HYBRID TRACTOR TRUCK

(71) Applicant: ELECTROCAMION INC., Girardville (CA)

(72) Inventor: Larry Bolduc, Girardville (CA)

(73) Assignee: ELECTROCAMION INC., Girardville (CA)

(*) Notice: Subject to any disclaimer, the term of this patent is extended or adjusted under 35 U.S.C. 154(b) by 646 days.

(21) Appl. No.: 17/096,093

(22) Filed: Nov. 12, 2020

(65) Prior Publication Data

US 2022/0144354 A1    May 12, 2022

(51) Int. Cl.
*B62D 53/08* (2006.01)
*B62D 53/06* (2006.01)

(52) U.S. Cl.
CPC .......... *B62D 53/08* (2013.01); *B62D 53/061* (2013.01); *B60L 2200/28* (2013.01)

(58) Field of Classification Search
CPC ...... B62D 53/08; B62D 53/061; B62D 53/06; B60L 2200/28
See application file for complete search history.

(56) References Cited

U.S. PATENT DOCUMENTS

| | | | | |
|---|---|---|---|---|
| 8,684,125 B2* | 4/2014 | Niva | ........................ | B60K 6/46 180/235 |
| 8,875,819 B2* | 11/2014 | Muggeo | ................ | B60W 20/20 180/65.25 |
| 9,937,819 B2* | 4/2018 | Healy | ................. | B60L 15/2009 |
| 10,150,358 B2* | 12/2018 | Soto | .......................... | B60K 6/48 |
| 10,449,954 B2* | 10/2019 | Layfield | .................. | B60L 15/32 |
| 10,500,975 B1* | 12/2019 | Healy | ....................... | B60K 6/48 |
| 10,518,662 B2* | 12/2019 | Schumacher | ......... | B60L 3/0092 |
| 10,821,853 B2* | 11/2020 | Healy | .................... | B60K 6/448 |
| 11,351,979 B2* | 6/2022 | Richter | ................. | B60W 20/11 |
| 2008/0265602 A1* | 10/2008 | Branning | ............... | B62D 21/14 296/26.08 |
| 2009/0223725 A1* | 9/2009 | Rodriguez | ................ | B60L 7/14 180/65.21 |
| 2011/0000721 A1* | 1/2011 | Hassett | ............... | B60L 15/2009 180/65.21 |

(Continued)

OTHER PUBLICATIONS

Dana, TM4, Commercial Vehicles, https://www.danatm4.com/vehicle-applications/commercial-vehicles/, Retrieved on Oct. 29, 2020.

*Primary Examiner* — Kevin Hurley
*Assistant Examiner* — Marlon A Arce
(74) *Attorney, Agent, or Firm* — Alexandre Daoust; Norton Rose Fulbright Canada LLP

(57) ABSTRACT

The hybrid tractor truck can have a cabin supported by a frame, the frame including two transversally spaced apart beams extending behind the cabin, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; and an electric machine supported by the frame behind the at least one rear axle, the electric machine being drivingly connected to the at least one rear axle, and at least one battery electrically connected to the electric machine.

22 Claims, 4 Drawing Sheets

(56) References Cited

U.S. PATENT DOCUMENTS

| | | | |
|---|---|---|---|
| 2013/0220719 A1* | 8/2013 | Kobayashi | B60L 3/00 |
| | | | 903/902 |
| 2018/0093655 A1* | 4/2018 | Healy | B60L 50/40 |
| 2018/0236994 A1* | 8/2018 | Healy | B60L 58/24 |
| 2019/0291593 A1* | 9/2019 | Healy | B60K 1/04 |
| 2021/0057791 A1* | 2/2021 | Harugaichi | B60L 50/66 |
| 2021/0362586 A1* | 11/2021 | Singh | B60K 11/02 |
| 2023/0025109 A1* | 1/2023 | Huang | B62K 5/05 |

\* cited by examiner

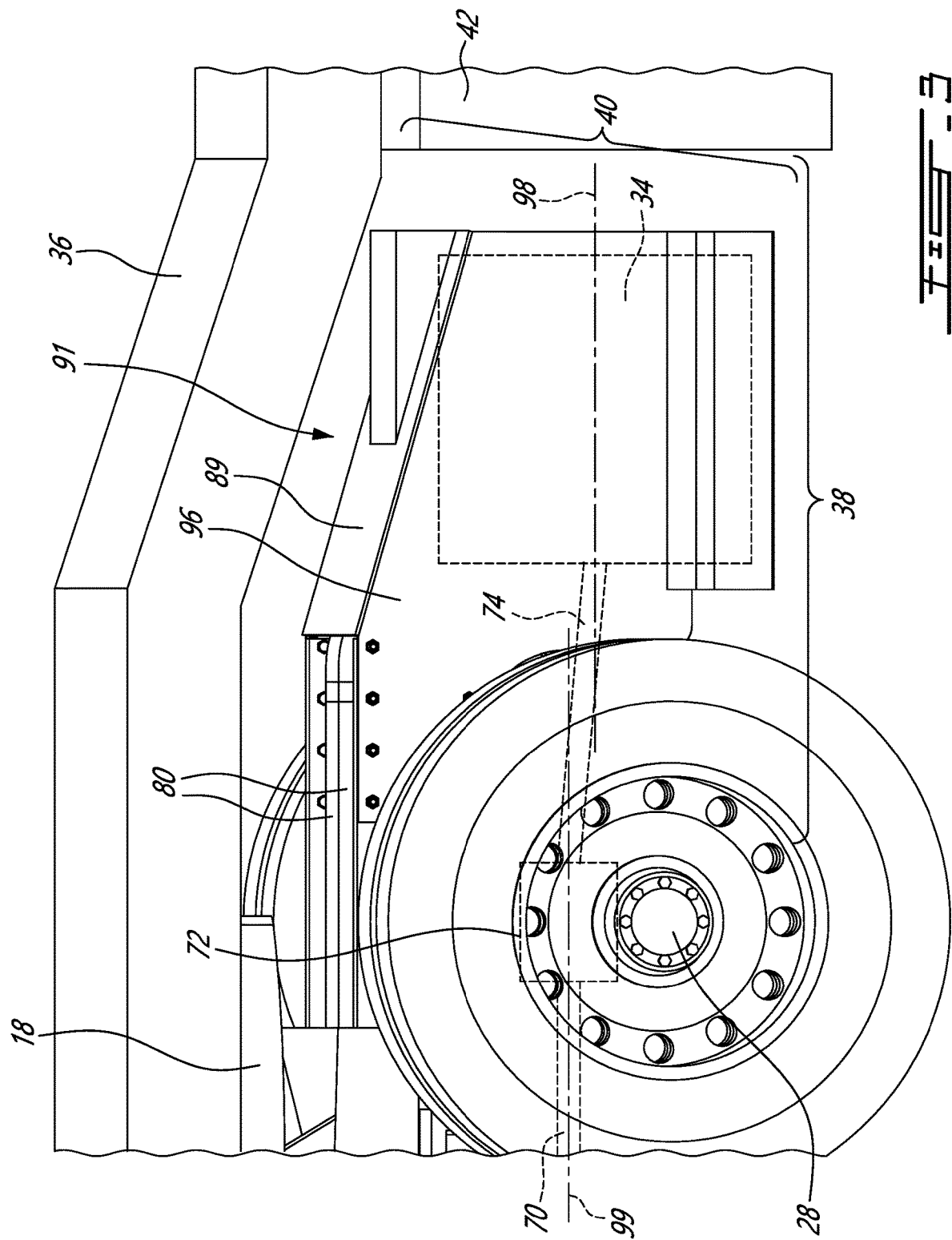

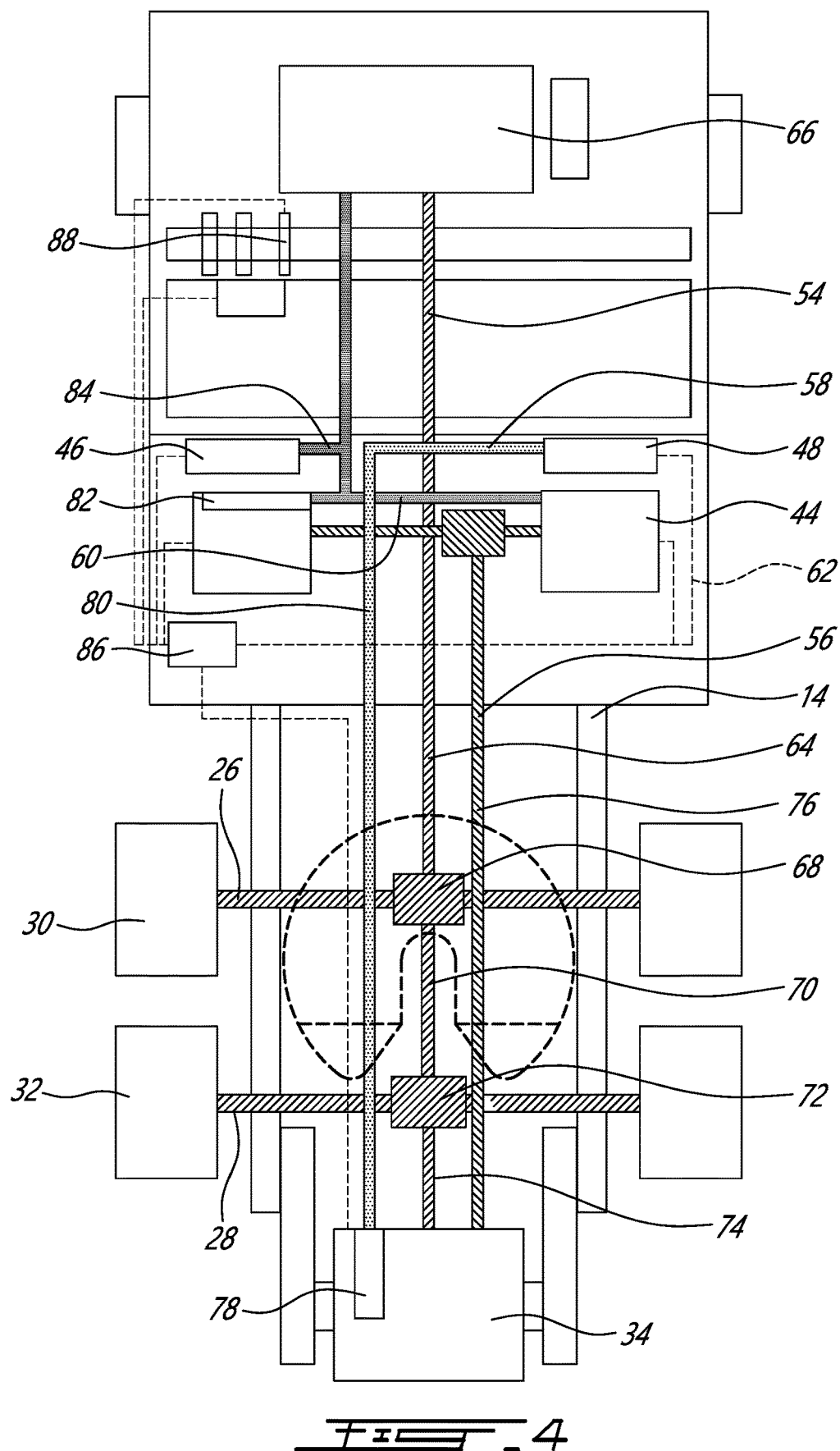

HYBRID TRACTOR TRUCK

BACKGROUND

Growing environmental concern over the last years and decades has led to a progressive electrification of the transport industry. Electric cars, in particular, have become particularly widespread in recent years and more and more models are becoming available every year. Hybrid concepts, in which electrical power was used to supplement heat engine power were the first to become available, leading eventually to plug-in hybrids and fully electric cars which omitted the heat engine altogether.

Electrification of transport is still meeting significant hurdles in heavier vehicles, however, and there remains much room for improvement.

SUMMARY

A hybrid tractor truck concept is presented herein. The hybrid tractor truck concept can be used to retrofit hybrid capacity to a heat engine tractor truck, or to directly manufacture a hybrid tractor truck, and can be useful for heavy tractor trucks, such as 150 ton capacity tractor trucks, for instance. The hybrid tractor truck concept involves positioning an electric machine which can serve both as an electric motor and an electric generator between the beams of the frame, behind the rearmost axle of the tractor truck. The electric machine can be drivingly connected to the rearmost axle by a drive shaft, to enable either driving the wheels, or extracting power from the wheels (braking). The battery, or batteries, can be positioned on a platform immediately behind the cabin, between the cabin and the fifth wheel, and electrical cables can extend along the frame between the battery or batteries and the electric machine (heavier trucks may benefit from more battery capacity). The electric machine can be cooled to remain within recommend operating temperatures, using cooling fluid. The cooling fluid can circulate in lines extending along the frame and connecting the electric machine to a radiator which can be positioned on the rear wall of the cabin, for instance. A radiator and/or heating system can also be used to cool and/or heat the battery/batteries if required. The temperature control systems of the electric machine and of the battery/batteries can be independent. In many application, sufficient space will be available to receive the electric machine between the rear axle and the trailer's structure and the electric machine can be mounted into that space via frame beam extenders or longer frame beams, for instance.

A computer can be used to operate the electric machine. The computer can receive the signal from the gas pedal potentiometer, for instance, and drive the electric motor to produce driving power from the batteries proportionally to the heat engine power, contingent upon battery capacity, for instance. The computer can also control the electric motor to store electrical energy by recovering braking power from the tractor truck either automatically when the gas pedal is released, or when the brake pedal is depressed, for instance. Such a hybrid tractor truck can advantageously recover braking energy for acceleration, and therefore lower its energy consumption and reliance on fossil fuels.

In accordance with one aspect, there is provided a hybrid tractor truck having a cabin supported by a frame, the frame including two transversally spaced apart beams extending behind the cabin, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; and an electric machine supported by the frame behind the at least one rear axle, the electric machine being drivingly connected to the at least one rear axle, and at least one battery electrically connected to the electric machine.

In accordance with another aspect, there is provided a method of retrofitting hybrid capacity to a tractor truck having a cabin supported by a frame, the frame including two transversally spaced apart beams extending behind the cabin to corresponding rear ends, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; the method comprising: assembling a beam extender to the rear end of each one of the beams, the beam extenders extending rearwardly from the beams; securing an electric machine to the beam extenders; drivingly connecting the electric machine to the at least one rear axle; mounting at least one battery to the tractor truck, and electrically connecting the at least one battery to the electric machine.

It will be understood that the expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

It will be understood that a computer, or controller, can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or controller, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 3 a side view of a portion of the hybrid tractor truck of FIG. 1 with a trailer hitched thereto, shown with the top cover plate.

FIG. 4 is a schematic view of an example of subsystem configuration for a hybrid tractor truck.

DETAILED DESCRIPTION

Figure 1:
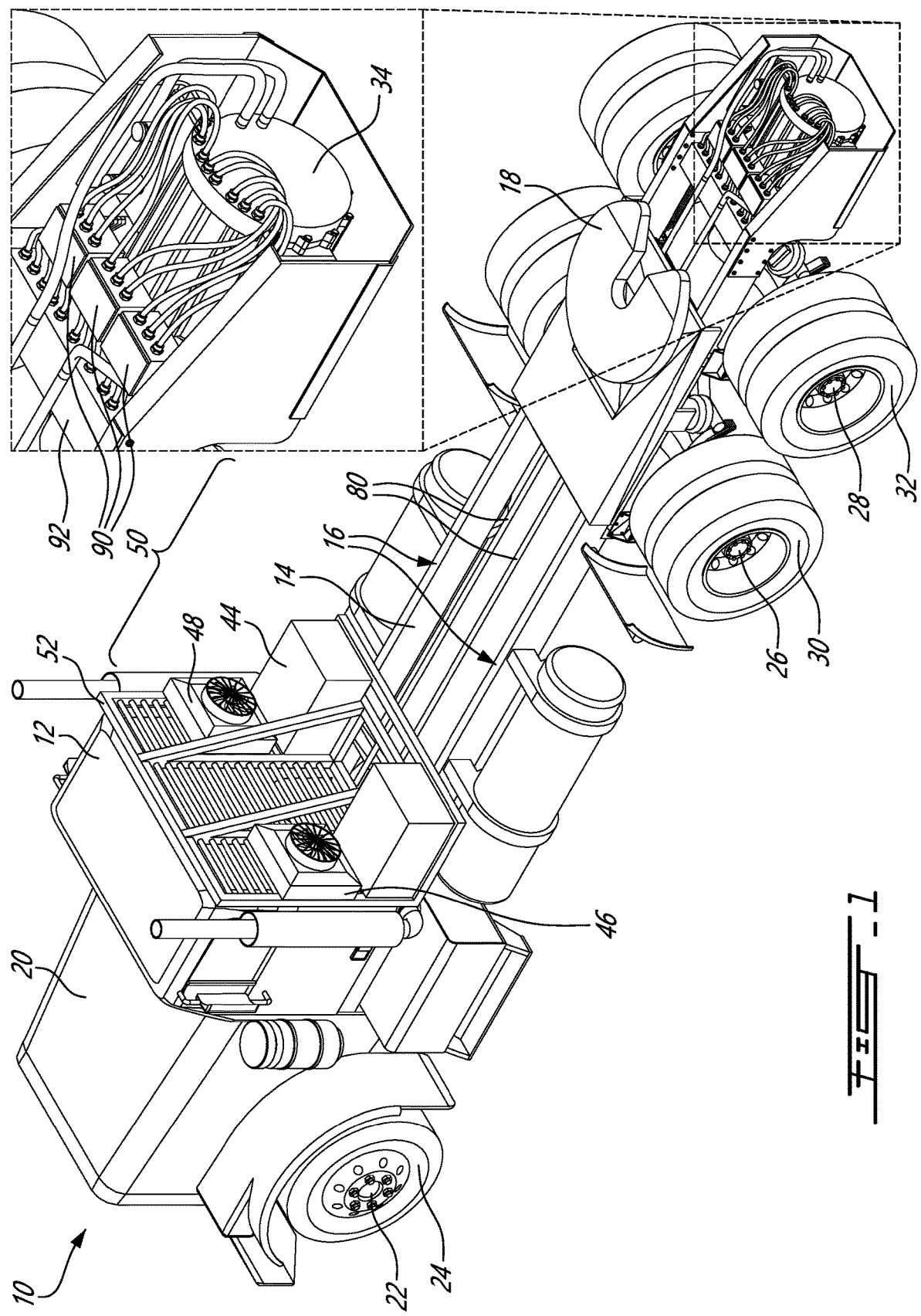
FIG. 1 is an oblique view of an example of a hybrid tractor truck, shown without the top cover plate.

FIG. 1 presents an oblique view of an example hybrid tractor truck 10 seen from the rear and from above. In this example, the hybrid tractor truck 10 has a base framework of a heavy tractor truck, e.g. 150 ton capacity, of the type commonly used for logging or mining. The hybrid tractor truck 10 includes a driver cabin 12, often called the cab, supported by a frame 14. The frame 14 has two transversally spaced apart beams 16 projecting rearwardly, behind the cabin 12 and leading to a fifth wheel 18. The fifth wheel 18 is also supported by the frame 14 and is positioned behind the cabin 12. The hybrid tractor truck 10 has a heat engine (not shown), such as a Diesel engine for instance, housed in an engine compartment 20 positioned in front of the cabin 12, generally overhanging a front axle 22 bearing front wheels 24. The front axle 22 is supported by a front portion of the frame 14. The hybrid tractor truck 10 has two rear axles 26, 28 also supported by the frame 14, behind the cabin 12. Each one of the rear axles 26, 28 has a corresponding set of rear wheels 30, 32, and the sets of rear wheels 30, 32 typically include two tires on each side.

Figure 2:
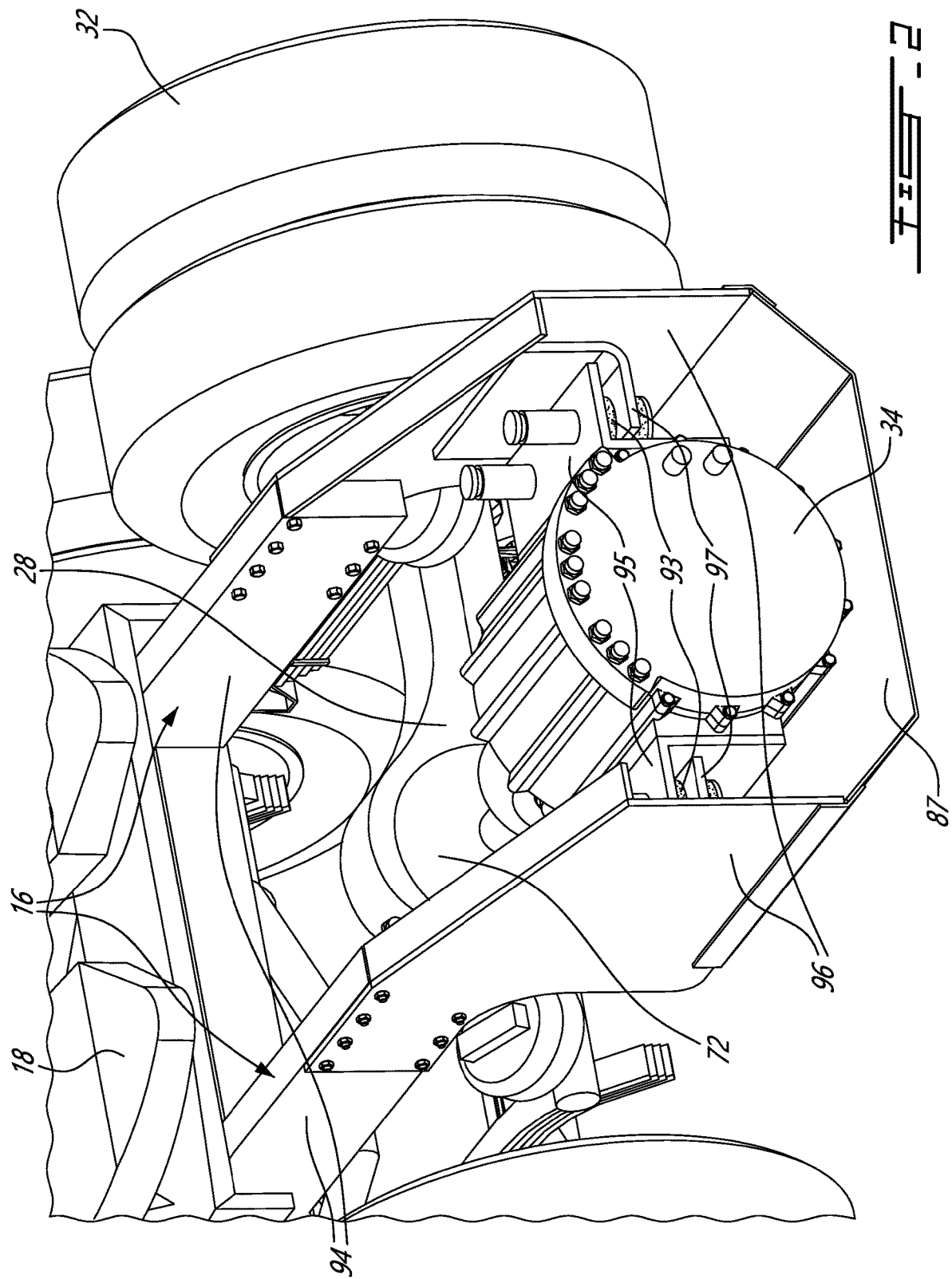
FIG. 2 is another oblique view of a portion of the hybrid tractor truck of FIG. 1, with some additional electrical and cooling components removed to show further detail.

Here, the hybrid tractor truck 10 includes an electric machine 34 which is supported by the frame 14 behind both rear axles 26, 28, as best shown in FIG. 2. The electric machine 34 is drivingly connected to the second rear axle 28, and is thus the rearmost element of the drivetrain. The electric machine 34 extends, to a certain extent, past the aft end of the rearmost wheels 32, while still remaining out of interference from the movement of the trailer 36 when a trailer 36 is attached to the fifth wheel 18, as shown in FIG. 3, given the spacing, which can include a horizontal clearance 38 and a vertical clearance 40, which can exist between the rear axle 28 and the trailer structure 42.

Generally, the electric machine 34 can selectively operate to recuperate energy from braking, thereby assisting in the braking function, and operating as a generator, or to assist in providing driving power, and thence operating as an electric motor. Performing these latter functionalities can require a number of systems, including electrical energy transfer with one or more battery 44, and cooling via one or more radiators 46, 48, as will be described in further detail in relation with the schematic presented in FIG. 4. However, before turning to FIG. 4, let us note that as shown in the example depicted in FIG. 1, the hybrid tractor truck 10 can include two batteries 44, each positioned on a corresponding side of the truck, on a deck immediately behind the cabin 12 and more specifically between the rear wall of the cabin and the fifth wheel, in another spacing 50, which can exist between the trailer 36 and the cabin 12. It will also be noted that the hybrid tractor truck 10 includes two radiators 46, 48 in this example, each positioned on a corresponding side of the truck, on the rear wall of the cabin 12, or more specifically in this example, on a vertical frame 52 extending alongside the rear wall of the cabin 12.

FIG. 4 presents a schematic of the different systems associated to the electric machine 34, including a mechanical system 54, an electrical system 56, an electric machine cooling system 58, a battery temperature management system 60, and a control system 62. We will now address each one of these systems in sequence.

Concerning the mechanical system 54, it will be noted that the electric machine 34 is the rearmost element of the drive train. In this example, the drive train is of a heavy truck configuration and includes two rear axles 26, 28, which can be referred to as the first rear axle 26 and the second rear axle 28. A primary shaft 64 is mechanically connected between the heat engine 66 and a differential 68 of the first rear axle 26. The differential 68 of the first rear axle 26 transfers power between the primary shaft 64 and two transversal shafts leading to the first set of wheels 30, here via planetary gearing (not shown) housed in each wheel. A secondary shaft 70 mechanically connects the differential 68 of the first rear axle 26 to the differential 72 of the second rear axle 28, and the differential 72 of the second rear axle 28, again, transfers power between the secondary shaft 70 and two transversal shafts leading to the second set of wheels 32 via planetary gearing housed in each wheel. The mechanical system 54 can be configured for the secondary shaft 70 to rotate at the same speed as the primary shaft 64, for instance. Here, yet a third, or tertiary, shaft 74 extends out of the second differential 72 and mechanically connects the differential 72 of the second rear axle 28 to the electric machine 34. In this example, the mechanical system 54 is configured for the third shaft 74 to rotate at the same speed as the primary 64 and secondary 70 shafts.

Different modes of operation can be applied. First, during braking, the electrical machine 34 can be operated in generator mode to resist the rotation of the wheels 30, 32 transmitted via the shafts and differentials 68, 72, and therefore extract energy from the inertia of the vehicle. This energy will be conveyed and stored in one or more batteries 44 via one or more electrical cable 76, as will be exemplified further below. Typically, the electric machine 34 will not be the only element of the truck contributing to braking, other braking devices can contribute as well such as traditional brakes, electromagnetic dissipation brakes and/or compression release engine/Jacob brake. In some embodiments, it can be advantageous to have one operating mode where the electric machine automatically brakes at maximum power throughput. Secondly, when accelerating, going uphill, and/or simply maintaining speed against friction, electrical energy previously stored in the one or more battery 44 can be extracted by the electric machine 34 and used to collaborate with the heat engine 66 in driving the wheels 30, 32. In some embodiments, other modes of operation can be provided for. It can be desired to use the electric machine 34 to store electric energy while the heat engine 66 is idling, for instance, or in some situations, such as if the tractor truck 10 is not loaded, it can be desired to enable using the electric machine 34 to drive the rotation of the wheels while maintaining the heat engine inoperative.

In one example, the truck 10 is of the heavy tractor truck type which can be adapted to carry loads up to 150 tons, such as a Kenworth C500 planetary tractor truck for instance. In the case of such a truck 10, an electric machine 34 selected from the SUMO™ MD series of electric machines manufactured by DANA TM4 can be used to drive or brake at a power above 200 kW at peak torques above 2500 Nm and operate above 3000 RPM, and generate energy savings while further increasing peak torque output and/or reducing heat engine 66, transmission, and differential 68, 72 usage, potentially prolonging the life of one or more of these components. It will be understood that such values of torque generate significant forces on the frame 14, and the electric machine holder should be designed in a manner to resist to such forces. Example electric machine holder designs will be discussed further below. Different forms of safeties can be used, such as contactors or breakers, to effectively cutoff the electric power transfer between the batteries 44 and the electric machine 34, and/or otherwise allow the electric machine 34 to freewheel, in the event where any abnormal event is detected.

Electric machines 34 generating such levels of power tend to generate a significant amount of heat, especially towards peak power operation, and can thus require cooling, which is the case of the SUMO™ MD series of electric machines. The electric machine 34 can have an internal heat exchanger 78 in the form of a cooling fluid path defined within its housing, for instance, and be configured in a manner to be connected to a cooling system 58 including fluid lines 80 and radiator 48. In one example, the radiator 48 can be positioned on a rearward face of the cabin, such as exemplified in FIG. 1, and fluid lines 80 can be used to connect the radiator 48 to the heat exchanger 78 of the electric machine 34. The cooling system 58 typically includes a fluid circulation pump (not shown), which can be electrical for instance, and an expansion reservoir (not shown). In the illustrated embodiments, the cooling fluid lines 80 extend along the length of the frame 14, between the two beams 16.

In the case of the example tractor truck illustrated in FIG. 1, two batteries 44 are used in a manner to reach a satisfactory energy capacity, which can be above 40 kWh for instance. The batteries 44 are located in this embodiment immediately behind the cabin 12, and more precisely between the cabin 12 and the fifth wheel 18, one on the left, one on the right hand side of the truck 10. Cables 64 are used to connect each one of the two batteries 44 to the electric machine 34. The cables 64 of the two batteries 44 can be joined in an electrical box, leading to a single set of cables for exchanging electrical power between the electrical box and the electric machine 34. The electrical box can include fuses or breakers. At peak operation, an amperage of above 200 Amp can circulate between the electric machine 34 and the batteries 44, which can generate a significant amount of heat, and there can be a certain amount of distance between the battery(ies) 44 and electrical machine 34 along which losses can occur. However, it was found that at least in some embodiments, such losses were well within acceptable range.

Depending on their type and make, the batteries 44 can be designed to operate within a limited range of temperature, and lose efficiency or stop functioning outside that range. Accordingly, in some cases, it can be desired to use an additional system to control the temperature of the batteries 44. Perhaps the most frequent need would be to provide cooling to the batteries 44 to address the heating of the batteries 44 when they operate at high amperage. This can be addressed by a battery temperature fluid system 60 which can be distinct and operable independently from the electric machine cooling system 58. The battery cooling system 60 can include a fluid circulation pump (not shown) and a plurality of channels placed in thermal contact with the batteries 44, and forming a heat exchanger 82 therewith. For cooling operation, a radiator 46 can be used. In some cases, such as when the truck 10 is operated in cold weather, cooling may not be required. Moreover, it may be required to provide a means of heating the batteries as well. This can be achieved by diverting heat from the heat engine 66, for instance, which can also be achieved via fluid conduits, and can simply use the fluid circulation system of the engine. In some embodiments, both heating and cooling capacity may be required, and it can be desired to control the functionality (cooling or heating) depending on the circumstances. In such an embodiment, a single fluid network can include lines which branch off both to a radiator 46 and to the heat engine 66, and an electrically controlled valve 84 can be used to selectively connect the heat exchanger 82 to the radiator 46, for cooling, or to the heat engine 66, for heating.

It will be understood that some form of control system 62 can advantageously be used to assist in controlling the operation of the electric machine 34, and that such a control system 62 can include a computer or other form of controller 86. The controller 86 can be centralized, or include a plurality of dispersed control elements. The control system 62 can include a first communication link between the controller and the electric machine 34, via which a control signal can be communicated to direct the operation of the electric machine 34. The controller 86 can base its control signal on a number of factors. For instance, it can be configured to receive an acceleration signal from a gas pedal 88 of the engine 66, such as the gas pedal potentiometer's signal, which can be a first indication on which the operation of the electric machine 34 can be based. The controller 86 can be configured in a manner to automatically operate the electric machine 34 in generator mode when the truck is moving and the driver removes his/her foot from the gas pedal, for instance. The controller 86 can also be configured in a manner to automatically operate the electric machine 34 in a manner to provide a level of drive power proportional to the gas pedal's potentiometer signal, for instance, and thereby always proportionally complement the amount of drive power generated by the heat engine 66, inasmuch as the batteries have stored energy in them. To this end, the controller 86 can have a communications link via which an sensor of the batteries can convey a signal indicative of the energy level of the battery(ies) 44. The controller 86 can have an additional communication link connecting it to a display screen or other form of display, to display information considered relevant to the driver, for instance, and can have a number of additional sensors to this end. For instance, the signal indicative of the amount of energy in the batteries can be used to display the relevant information to the driver. The control system 62 can also include temperature sensors to provide an indication of the temperature of some elements of the system, such as the batteries 44, the electric machine 34, wires or cables, etc. The same controller element, or a different controller elements, can be used to control peripheral systems such as the electrical motor cooling system 58 (radiator and pump), and/or the battery temperature management system 60. In one embodiment, the same computer is used to control all subsystems and has a dedicated software.

Similarly, a communication link can be established between the controller 86 and the brake pedal, to receive a braking signal. The controller can be configured to operate the electric machine 34 in regeneration mode at a regeneration power proportional to the amplitude of the braking signal, for instance, or simply to automatically regenerate at maximum regeneration power when the brake pedal is pressed, for instance.

Safeties can be implemented on the electric machine 34. For instance, the operation of the electric machine other than in a freewheeling mode (e.g. generating or driving) can be contingent upon positively receiving a control signal from the controller, and the electric machine can automatically be placed in a freewheeling mode if the control signal is not received for a given amount of times (e.g. 30 seconds). This control can be effected by safeties 90 shown in FIG. 1, where an electrical interface 92 is also shown.

Different tractor trucks can have different architectures. For instance, different tractor trucks can have one, two, or three rear axles, and the hybrid concept presented herein can be adapted to many of these architectures. Accordingly, the expression at least one rear axle will be used to encompass 1, 2 or 3 rear axles. Indicating that the electric machine is behind the at least one rear axle in this specification means that it is located rearwardly of the rearmost one of the rear axles, e.g. in a three rear axle configuration, the electric machine is positioned behind the third rear axle, relative to the forward direction of the vehicle. Depending on the architecture, the different rear axles can be interconnected with drive shafts, or not. For instance, in a two rear axle configuration, the heat engine can be drivingly connected to the first rear axle, the electric machine can be connected to the second rear axle, and power transfer between the heat engine and the electric machine can still occur through the road, e.g. via the rotation of the first set of wheels which entrains movement of the truck relative to the road and thus rotation of the second set of wheels becomes driven by the road. On smaller tractor trucks, a lower battery capacity may be deemed necessary, and only one battery can be used instead of two, for instance. Similarly, cooling of the battery (ies) may not be required in some embodiments, such as smaller trucks, and in some cases, even cooling of the electric machine may not be required.

It will be understood that the hybrid capability concept presented above can either be integrated to a truck at the time of manufacturing the truck, or retrofitted to an existing truck. Mounting the electric machine 34 behind the rearmost axle of the truck can require a longer frame than for an embodiment which is otherwise the same but without the hybrid capability. Indeed, mounting the electric machine 34 in a sturdy manner on the frame can be essential to reach satisfactory levels of torque. When designing a truck architecture with the hybrid capability in mind, one can design the frame beams 16 specifically in a manner to protrude farther back than they would otherwise protrude, and thereby provide some anchor point for securing and protecting the electric motor. This being said, the hybrid capability can also be retrofitted onto an existing truck by extending the frame beams 16. The truck's existing frame beams can be referred to as "parent" beams 94 in this context, and beam extenders 96 can be secured to the rear ends of the parent beams 94 such as by fastening and/or soldering, thereby providing additional structural length. This will now be exemplified.

Referring to FIG. 2, it will be understood that in an embodiment such as the Kenworth C500 tractor truck, the first and second differentials 68, 72 can be essentially identical components (e.g. have the same part number), but where the rear wall of the housing of the first differential 68 is perforated to accommodate the secondary shaft 70 connecting it to the second differential 72, whereas the second differential 72 can be left with an unperforated rear wall 96 when no hybrid capacity was intended at the time of manufacture. In the case of retrofitting a hybrid capacity to such a tractor truck, the retrofitting can involve perforating the rear wall 96 of the housing of the second differential in a manner to connect the second differential 72 to the electric machine 34 in a manner similar to the way the first differential 68 is connected to the second differential 72. Referring to FIG. 3, it will be understood that to allow unaltered trailer operation capacity, the available space for the electric machine 34 behind the rearmost axle may be limited both in length and in height. It can thus be preferred to position the electric machine 34 in a manner for its shaft connector/axis 98 to extend slightly lower than the connector/axis 99 of the second differential 72, which can be possible, for instance, when the connectors are maintained parallel (i.e. the axis 99 of the secondary drive shaft 70 and the axis 98 of the electric machine 34 are parallel, even though offset, such as in the illustrated embodiment).

It will also be understood that in the specific example presented in FIGS. 1-3, the hybrid capacity having been retrofitted to the heat engine tractor truck, the parent beams 94 of the frame 14 were extended using beam extenders 96 projecting rearwardly and downwardly from the ends of the parent beams 94, to form a sturdy attachment point for the electric machine 34. Indeed, support brackets 95 can be secured to the housing of the electric machine 34 on each side, having machine flanges extending transversally outwardly from the electric machine 34. Similarly, support brackets 97 can be secured to the beam or beam extenders 96, and the support brackets 97 can have beam flanges extending transversally inwardly from beams, vertically overlapping the machine flanges. The beam flanges and the machine flanges can be secured sturdily to one another via bushings 93 which can accommodate the high torques which can occur between the housing of the electric machine 34 and the differential 72, which, in turn, are transferred between the electric machine 34 and the frame 14.

Turning now to FIG. 3, it can be desired to provide a sturdy protective enclosure 91 to the electric machine 34, to avoid gravel and rocks lifted by the wheels from the road damaging the electric machine 34, for instance. In the embodiment illustrated, the beam extenders 96 are used as two side walls of this protective enclosure 91. The protective enclosure 91 is completed by a top cover plate 89 extending above the electric machine 34 and secured to the top of the side walls, and a bottom cover plate 87 extending below the electric machine 34 and secured to the bottom of the side walls. In this embodiment, it was deemed unnecessary to close off the rear of the protective enclosure, since it is rearwardly oriented and potentially damaging foreign materials would be expected to come from the sides or the front. Some form of protection can also be provided in the bottom front of the enclosure, if the bottom front of the enclosure is not hid behind the differential. A mud flap or an upwardly turned front portion of the bottom cover plate are two potential examples.

As can be understood, the examples described above and illustrated are intended to be exemplary only. The scope is indicated by the appended claims.

What is claimed is:

1. A hybrid tractor truck having a cabin supported by a frame, the frame including two transversally spaced apart beams extending behind the cabin, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; and an electric machine supported by the frame behind the at least one rear axle, the electric machine being drivingly connected to the at least one rear axle via a shaft, and at least one battery electrically connected to the electric machine; wherein the at least one rare axle is two rear axles, including at least a first rear axle and a second rear axle; wherein the first rear axle has a first differential drivingly connected to the heat engine via a primary shaft, and connected to the corresponding wheels via transversal shafts, the second rear axle has a second differential connected to the primary shaft via the first differential and connected to the corresponding wheels via other transversal shafts, wherein the shaft is a tertiary shaft, wherein the electric machine is connected to the second differential via the tertiary shaft, the tertiary shaft being connected to the secondary shaft via the second differential.

2. The hybrid tractor truck of claim 1 wherein the at least one battery is supported by the frame between the cabin and the fifth wheel, further comprising a radiator supported at a rear wall of the cabin, and a cooling fluid line fluidly connecting the radiator and the electric machine, the radiator being operable to cool the electric machine, the electric machine being selectively operable to receive power from the at least one rear axle and store said power in the form of electrical energy in the batteries, or to drive the at least one rear axle using the electrical energy of the batteries.

3. The hybrid tractor truck of claim 1 wherein the hybrid tractor truck is a heavy truck having more than 100 ton in capacity.

4. The hybrid tractor truck of claim 3 further comprising at least two batteries, one on each side of the truck.

5. The hybrid tractor truck of claim 1 further comprising a radiator supported at the rear wall of the cabin, and a cooling fluid line fluidly connecting the radiator to a heat exchanger in thermal exchange contact with and the at least one battery, the radiator being operable to cool the at least one battery.

6. The hybrid tractor truck of claim 1 wherein the heat engine has a cooling fluid system, further comprising fluid lines fluidly connecting the heat engine's cooling fluid system to a heat exchanger in contact with the at least one battery.

7. The hybrid tractor truck of claim 1 further comprising machine flanges extending transversally outwardly from a housing of the electric machine, beam flanges extend transversally inwardly from beams, vertically overlapping the machine flanges and secured to the machine flanges via bushings.

8. The hybrid tractor truck of claim 1 wherein each beam includes a corresponding beam extender projecting rearwardly from a rear end of a corresponding parent beam.

9. The hybrid tractor truck of claim 8 wherein the beam extenders extend vertically more broadly than the parent beams and form side walls of a electric machine housing, further comprising a top cover plate extending above electric machine and secured to top of the side walls, and a bottom cover plate extending below electric machine and secured to the bottom of the side walls.

10. The hybrid tractor truck of claim 1 further comprising a computer, a gas pedal in the cabin, the gas pedal communicatively coupled to convey an acceleration signal to the computer, a battery capacity sensor communicatively coupled to convey a battery capacity signal to the computer, the computer being configured to drive the at least one rear axle based upon both the acceleration signal and the battery capacity signal.

11. The hybrid tractor truck of claim 10 wherein the computer is further configured to automatically operate electric machine based on an indication in the acceleration signal that no acceleration is requested by the driver.

12. The hybrid tractor truck of claim 10 further comprising a brake pedal communicatively coupled to convey a braking signal to the computer, the computer being configured to drive the electric machine to brake the at least one rear axle based upon both the acceleration signal and the battery capacity signal.

13. A method of retrofitting hybrid capacity to a tractor truck having a cabin supported by a frame, the frame including two transversally spaced apart beams extending behind the cabin to corresponding rear ends, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; the method comprising:
Assembling a beam extender to the rear end of each one of the beams, the beam extenders extending rearwardly from the beams;
Securing an electric machine to the beam extenders;
Drivingly connecting the electric machine to the at least one rear axle;
Mounting at least one battery to the tractor truck, and
Electrically connecting the at least one battery to the electric machine.

14. The method of claim 13 wherein said mounting the at least one battery to the tractor truck includes mounting the at least one battery directly or indirectly to the frame, between the cabin and the fifth wheel.

15. The method of claim 13 further comprising mounting a radiator to a rear wall of the cabin and fluidly connecting the radiator to the electric machine.

16. The method of claim 13 wherein said drivingly connecting the electric machine to the at least one rear axle includes perforating an aperture in a rear wall of a differential and connecting the electric machine to the differential via a shaft.

17. The method of claim 13 further comprising mounting a radiator to a rear wall of the cabin and fluidly connecting the radiator to a heat exchanger in thermal exchange contact with the at least one battery.

18. The method of claim 13 further comprising fluidly connecting a heat exchanger in thermal exchange contact with the at least one battery to a cooling fluid system of the heat engine.

19. The method of claim 13 further comprising positioning a top cover plate above the electric machine and securing it to the beam extenders, and positioning a bottom cover plate below the electric machine and secured it to the beam extenders.

20. The method of claim 13 further comprising installing a controller to the tractor truck, connecting the controller to receive an acceleration signal from the gas pedal, and connecting the controller to receive a battery capacity signal from the at least one battery.

21. A hybrid tractor truck having a cabin supported by a frame, the frame including two transversally spaced apart beams extending behind the cabin, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; and an electric machine supported by the frame behind the at least one rear axle, the electric machine being drivingly connected to the at least one rear axle, and at least one battery electrically connected to the electric machine; wherein the at least one rear axle is two rear axles, including a first rear axle and a second rear axle; wherein the first rear axle has a first differential drivingly connected to the heat engine via a primary shaft, and connected to the corresponding wheels via transversal shafts and planetary gearing, the second rear axle has a second differential connected to the primary shaft via the first differential and connected to the corresponding wheels via a other transversal shafts and planetary gearing, wherein the electric machine is connected to the second differential via a tertiary shaft, the tertiary shaft being connected to the secondary shaft via the second differential.

22. A hybrid tractor truck having a cabin supported by a frame, the frame including two transversally spaced apart beams extending behind the cabin, a fifth wheel supported by the frame behind the cabin, a front axle bearing front wheels, at least one rear axle supported by the frame behind the cabin, the at least one rear axle bearing rear wheels, a heat engine located in an engine compartment supported by the frame in front of the cabin, the heat engine drivingly connected to said at least one rear axle; and an electric machine supported by the frame behind the at least one rear axle, the electric machine being drivingly connected to the at least one rear axle, and at least one battery electrically connected to the electric machine; wherein each beam includes a corresponding beam extender projecting rearwardly from a rear end of a corresponding parent beam; wherein the beam extenders extend vertically more broadly than the parent beams and form side walls of a electric machine housing, further comprising a top cover plate extending above electric machine and secured to top of the side walls, and a bottom cover plate extending below electric machine and secured to the bottom of the side walls.

* * * * *